(12) United States Patent
Pang et al.

(10) Patent No.: US 8,960,551 B2
(45) Date of Patent: Feb. 24, 2015

(54) METHOD OF DECODING BARCODE WITH IMAGING SCANNER HAVING MULTIPLE OBJECT SENSORS

(71) Applicant: Symbol Technologies, Inc., Schaumburg, IL (US)

(72) Inventors: Robert J. Pang, Williston Park, NY (US); Edward D. Barkan, Miller Place, NY (US); Thomas E. Lackemann, Sayville, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 122 days.

(21) Appl. No.: 13/800,452

(22) Filed: Mar. 13, 2013

(65) Prior Publication Data

US 2014/0191039 A1    Jul. 10, 2014

Related U.S. Application Data

(60) Provisional application No. 61/749,451, filed on Jan. 7, 2013.

(51) Int. Cl.
*G06K 7/10*   (2006.01)
*G06K 7/14*   (2006.01)

(52) U.S. Cl.
CPC ............ *G06K 7/1408* (2013.01); *G06K 7/14* (2013.01); *G06K 7/10722* (2013.01); *G06K 7/10821* (2013.01); *G06K 7/1096* (2013.01)
USPC ................................ 235/462.31; 235/472.01

(58) Field of Classification Search
CPC .......... G06K 7/10722; G06K 7/10821; G06K 7/1096; G06K 7/14; G06K 7/1408; H05B 37/0209; H05B 37/0227; Y02B 20/44

USPC ............ 235/462.01–462.45, 472.01, 472.02, 235/472.03
See application file for complete search history.

(56) References Cited

U.S. PATENT DOCUMENTS

| | | | |
|---|---|---|---|
| 3,457,422 A | | 7/1969 | Rottmann |
| 7,331,686 B2 * | | 2/2008 | Ossevoort et al. ............ 362/145 |
| 2007/0210167 A1 * | | 9/2007 | Knowles et al. ......... 235/462.11 |
| 2007/0262152 A1 * | | 11/2007 | Knowles et al. ......... 235/462.41 |
| 2008/0110994 A1 * | | 5/2008 | Knowles et al. ......... 235/462.42 |
| 2010/0019042 A1 | | 1/2010 | Barkan |
| 2010/0252635 A1 | | 10/2010 | Drzymala et al. |

FOREIGN PATENT DOCUMENTS

| | | | |
|---|---|---|---|
| EP | 548451 | A2 | 6/1993 |
| EP | 0907138 | A2 | 4/1999 |
| EP | 2463803 | A1 | 6/2012 |
| WO | 2008011067 | A2 | 1/2008 |
| WO | 2011159429 | A1 | 12/2011 |

* cited by examiner

*Primary Examiner* — Thien M Le
(74) *Attorney, Agent, or Firm* — Nong-Qiang Fan

(57) ABSTRACT

A method of decoding using an imaging scanner having multiple object sensors each associated with an object field of view. The method includes determining a moving direction of the object using at least two of the multiple object sensors. The moving direction of the object points from a first side to a second side of the imaging scanner. The method includes detecting whether a new object is presence with the object sensor located on the first side of the imaging scanner, and upon detecting the presence of the new object within the object field of view of the object sensor located on the first side of the imaging scanner, capturing an image of the new object in memory with the solid-state imager.

20 Claims, 15 Drawing Sheets

US 8,960,551 B2

METHOD OF DECODING BARCODE WITH IMAGING SCANNER HAVING MULTIPLE OBJECT SENSORS

RELATED APPLICATIONS

The present application is related to claims benefit under 35 U.S.C. §119(e) from U.S. Provisional Patent Application Ser. No. 61/749,451, filed Jan. 7, 2013, titled "METHOD OF DECODING BARCODE WITH IMAGING SCANNER HAVING MULTIPLE OBJECT SENSORS", the entire contents of which being incorporated herein by reference.

FIELD OF THE DISCLOSURE

The present invention relates to imaging-based barcode readers.

BACKGROUND

Various electro-optical systems have been developed for reading optical indicia, such as bar codes. A bar code is a coded pattern of graphical indicia comprised of a series of bars and spaces of varying widths, the bars and spaces having differing light reflecting characteristics. The pattern of the bars and spaces encode information. Bar code may be one dimensional (e.g., UPC bar code) or two dimensional (e.g., DataMatrix bar code). Systems that read, that is, image and decode bar codes employing imaging camera systems are typically referred to as imaging-based bar code readers or bar code scanners.

Imaging-based bar code readers may be portable or stationary. A portable bar code reader is one that is adapted to be held in a user's hand and moved with respect to target indicia, such as a target bar code, to be read, that is, imaged and decoded. Stationary bar code readers are mounted in a fixed position, for example, relative to a point-of-sales counter. Target objects, e.g., a product package that includes a target bar code, are moved or swiped past one of the one or more transparent windows and thereby pass within a field of view of the stationary bar code readers. The bar code reader typically provides an audible and/or visual signal to indicate the target bar code has been successfully imaged and decoded. Sometimes barcodes are presented, as opposed to be swiped.

A typical example where a stationary imaging-based bar code reader would be utilized includes a point of sale counter/cash register where customers pay for their purchases. The reader is typically enclosed in a housing that is installed in the counter and normally includes a vertically oriented transparent window and/or a horizontally oriented transparent window, either of which may be used for reading the target bar code affixed to the target object, i.e., the product or product packaging for the product having the target bar code imprinted or affixed to it. The sales person (or customer in the case of self-service check out) sequentially presents each target object's bar code either to the vertically oriented window or the horizontally oriented window, whichever is more convenient given the specific size and shape of the target object and the position of the bar code on the target object.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
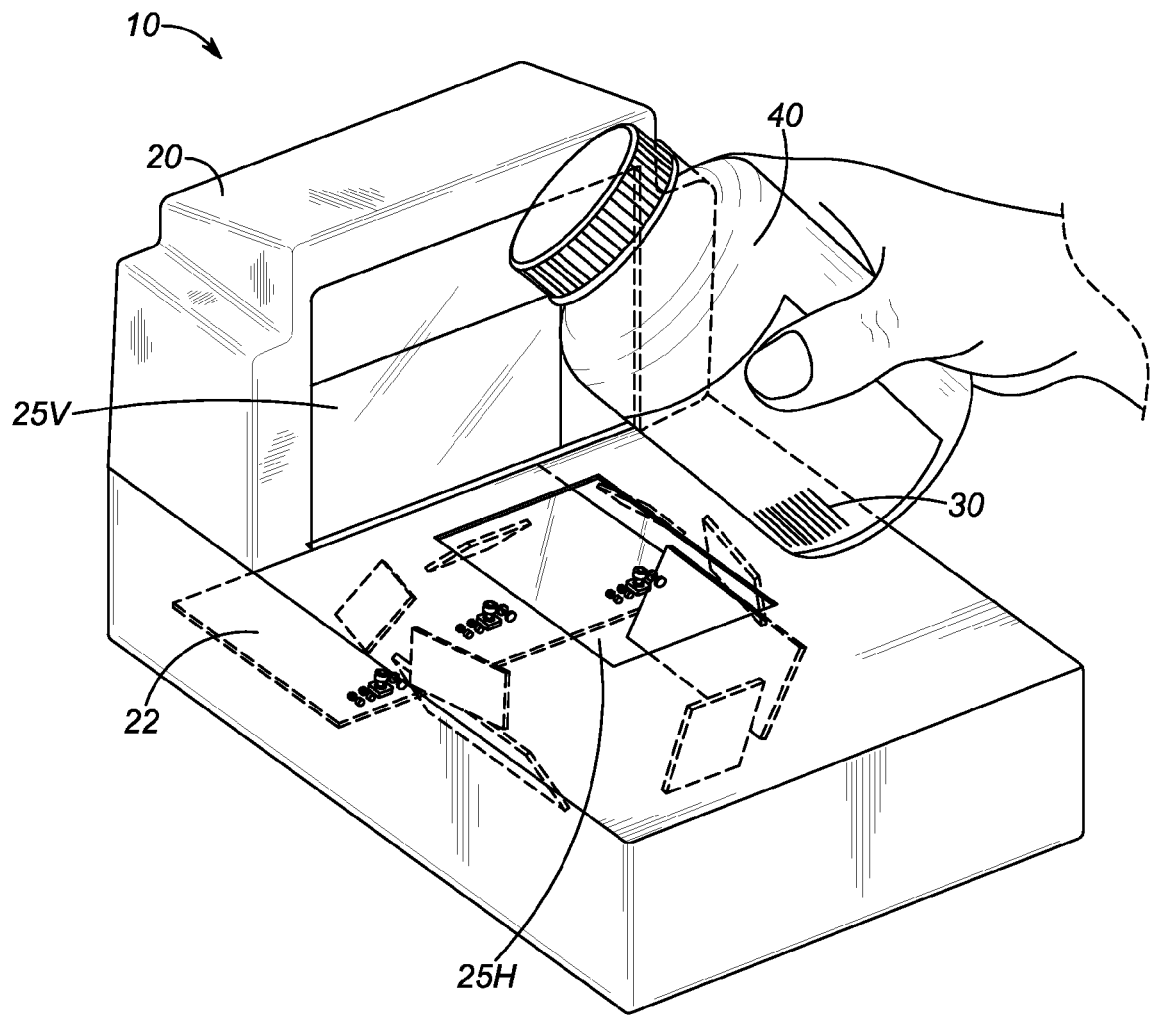
FIG. 1 depicts a workstation in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 depicts a workstation 10 in accordance with some embodiments. The workstation 10 is stationary and includes a housing 20. The housing 20 has a generally horizontal window 25H and a generally vertical window 25V. In one implementing, the housing 20 can be integrated into the sales counter of a point-of-transaction system. The point-of-transaction system can also includes a cash register, a touch screen visual display, a printer for generating sales receipts, or other type user interface. The workstation 10 can be used by retailers to process transactions involving the purchase of products bearing an identifying target, such as UPC symbols.

In accordance with one use, either a sales person or a customer will present a product or target object 40 selected for purchase to the housing 20. More particularly, a target bar code 30 imprinted or affixed to the target object will be presented in a region near the windows 25H and 25V for reading, that is, imaging and decoding of the coded indicia of the target bar code. Upon a successful reading of the target bar code, a visual and/or audible signal will be generated by the workstation 10 to indicate to the user that the target bar code 30 has been successfully imaged and decoded.

Figure 2:
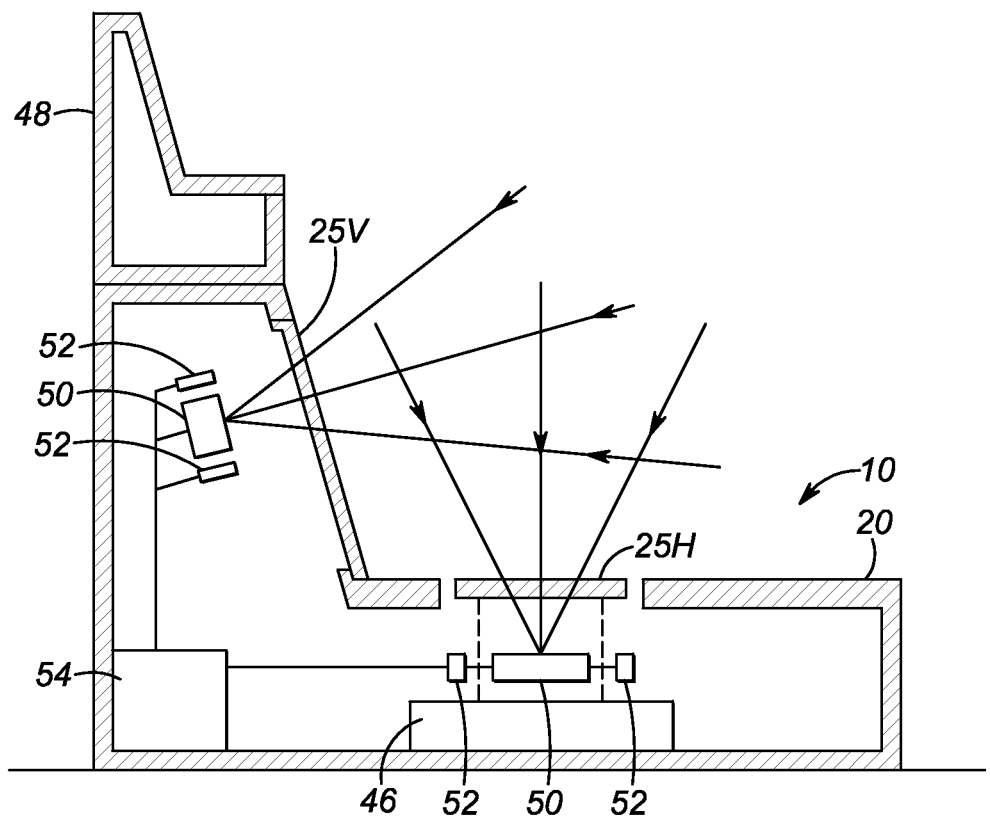
FIG. 2 is a schematic of a bi-optical workstation that includes a plurality of solid-state imagers in accordance with some embodiments.

As schematically shown in FIG. 2, a plurality of solid-state imagers 50, each including an illuminator 52, are mounted at the workstation 10, for capturing light passing through either or both windows from a target which can be a one- or two-dimensional symbol, such as a two-dimensional symbol on a driver's license, or any document, as described below. Each imager 50 is a solid-state area array, preferably a CCD or CMOS array. The imagers 50 and their associated illuminators 52 are operatively connected to a programmed microprocessor or controller 54 operative for controlling the operation of these and other components. Preferably, the microprocessor is the same as the one used for decoding the return light scattered from the target and for processing the captured target images.

In operation, the microprocessor 54 sends successive command signals to the illuminators 52 to pulse the LEDs for a short time period of 100 microseconds or less, and successively energizes the imagers 50 to collect light from a target only during said time period, also known as the exposure time period. By acquiring a target image during this brief time period, the image of the target is not excessively blurred.

The illumination source 54 usually is energized to address low ambient light conditions and to minimize hand jitter impact or swiping objects though the FOV on reading performance. On the other hand having bright illumination of an imaging scanner in constantly on state is annoying and bothersome for the user. It is also not efficient from power management perspective. Therefore it is beneficial to have an object sensing system which energizes illumination system only if the object of interest is presented within the predetermined FOV of the imaging scanner 50 and at a certain distance from the scanner. The object detecting system usually includes an infrared LED and a photodetector. When an object is presence in an object field of view of the object detecting system, light projected upon such object will be reflected and scattered back towards the object detecting system, and the reflected and scattered light will be detected by the photodetector of the object detecting system.

As previously stated, FIG. 2 is only a schematic representation of an all imager-based workstation as embodied in a bi-optical workstation with two windows. The workstation can have other kinds of housings with different shapes. The workstation can have one window, two windows, or with more than two windows. In some embodiments, the workstation can include between three to six solid-state imagers. The bi-optical workstation can also include more than six solid-state imagers.

A bi-optical workstation often have multiple subfields of views each provides optimum visibility of a target barcode on the various sides of the product 40 being passed through the scan zone. For examples, FIGS. 3A-3F shows bi-optical workstation that has six subfields of views in accordance with some embodiments. The six subfields are oriented to be most effective for reading indicia on products oriented in the most common ways presented to the workstation by users. The six subfields provide redundant coverage for the indicia located in common positions on the products, thereby assuring maximum performance when used by typical users.

Figure 3A:
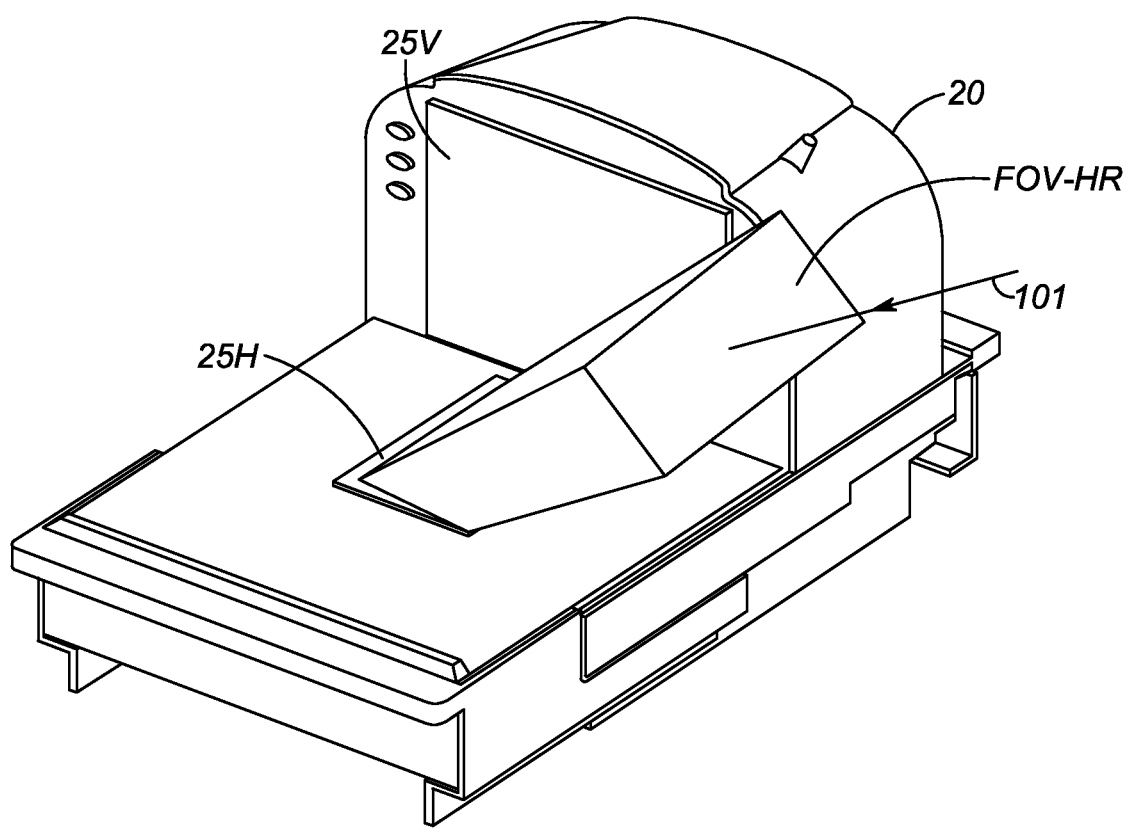
FIGS. 3A-3F shows bi-optical workstation that has six subfields of views in accordance with some embodiments.
Figure 3B:
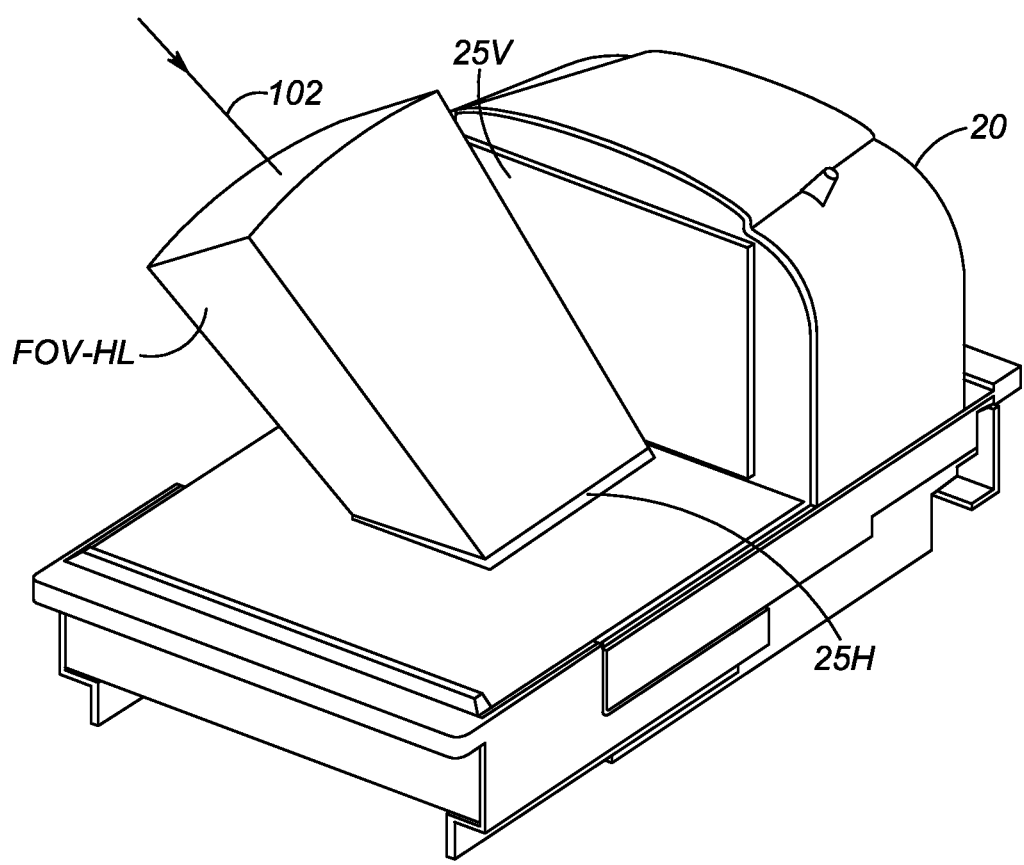
Figure 3C:
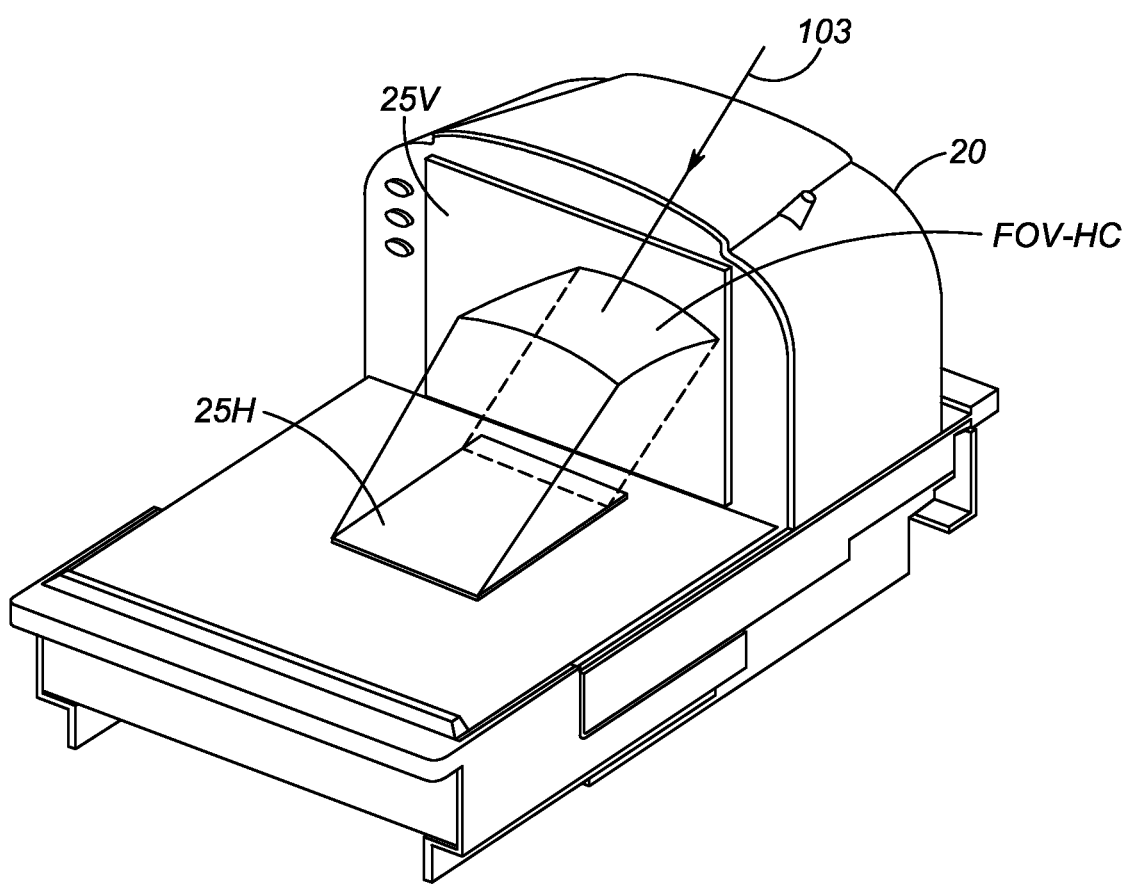

As shown in FIGS. 3A-3C, light ray 101 entering subfield FOV-HR, light ray 102 entering subfield FOV-HL, and light ray 103 entering subfield FOV-HC all passé through the horizontal window 25H and are detected by one or more solid-state imagers. In some implementations, three solid-state imagers are used, and light ray entering each one of the subfields (i.e. subfield FOV-HR, subfield FOV-HL, and subfield FOV-HC) is detected by one of the solid-state imagers. In other implementations, a single solid-state imager is used, and light ray entering each one of the subfields (i.e. subfield FOV-HR, subfield FOV-HL, and subfield FOV-HC) are all detected by this single solid-state imager when the field of view of this ingle solid-state imager is spitted into three subfields with multiple mirrors.

Figure 3D:
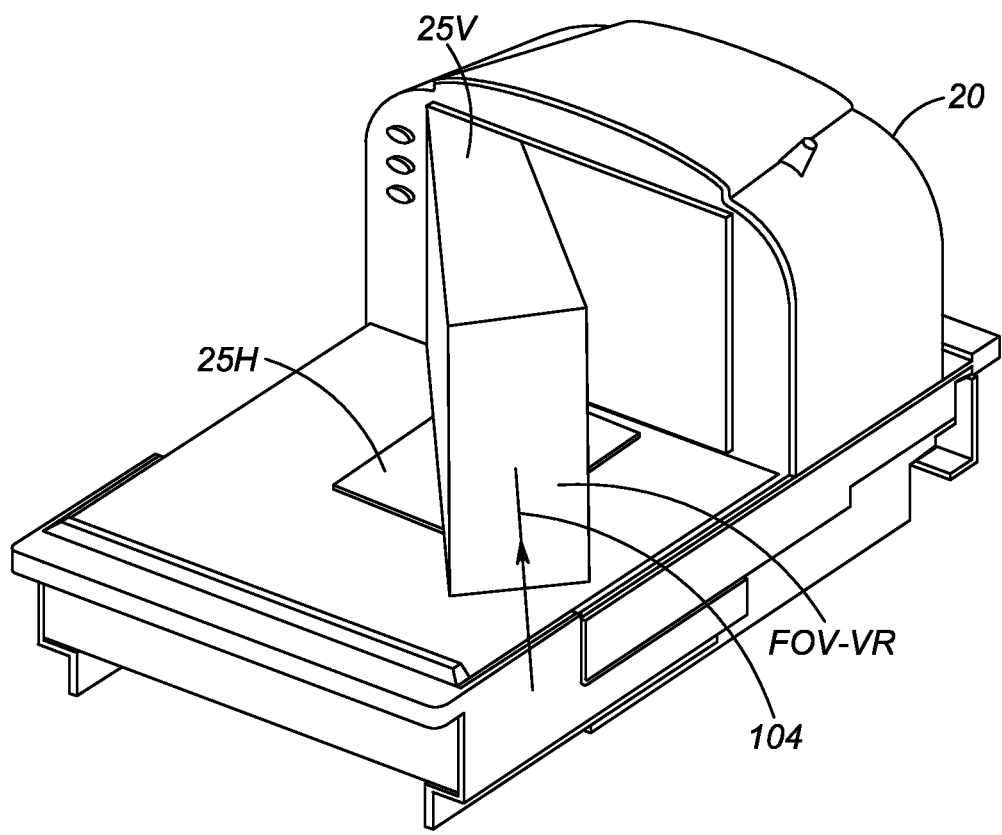
Figure 3E:
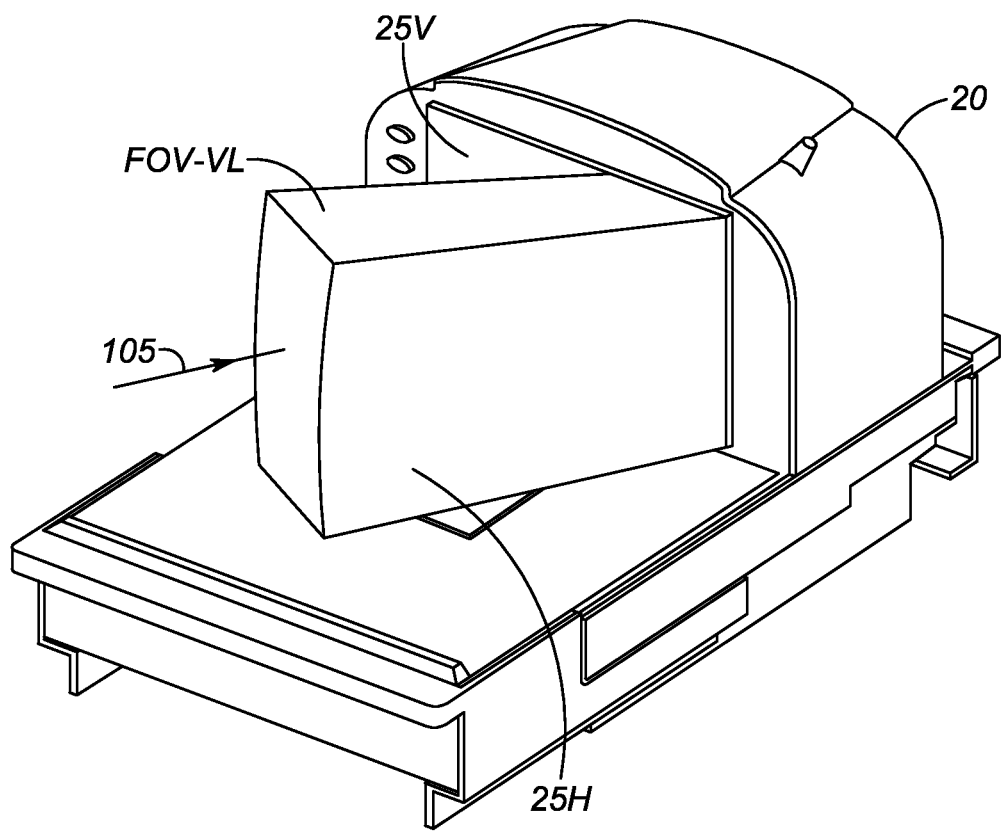
Figure 3F:
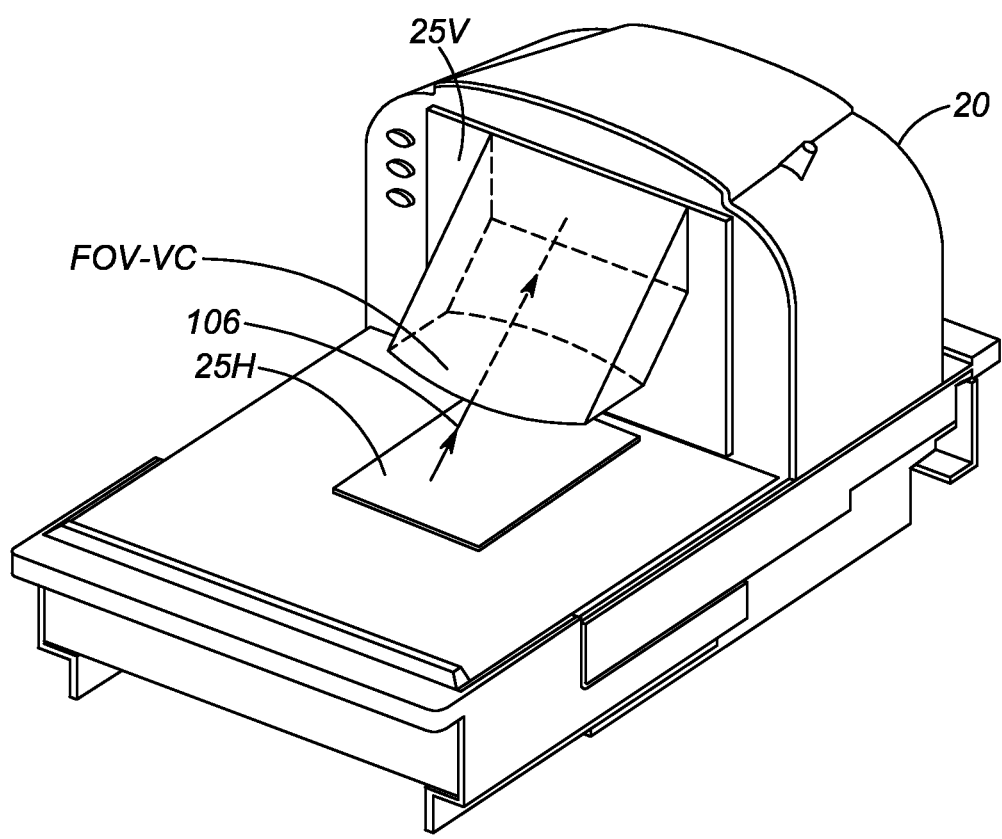

Similarly, As shown in FIGS. 3D-3F, light ray 104 entering subfield FOV-VR, light ray 105 entering subfield FOV-VL, and light ray 106 entering subfield FOV-VC all passé through the vertical window 25V and are detected by one or more solid-state imagers. In some implementations, three solid-state imagers are, and light ray entering each one of the subfields (i.e. subfield FOV-VR, subfield FOV-VL, and subfield FOV-VC) is detected by one of the solid-state imagers. In other implementations, a single solid-state imager is used, and light ray entering each one of the subfields (i.e. subfield FOV-VR, subfield FOV-VL, and subfield FOV-VC) are all detected by this ingle solid-state imager when the field of view of this single solid-state imager is spitted into three subfields with multiple mirrors.

Figure 4:
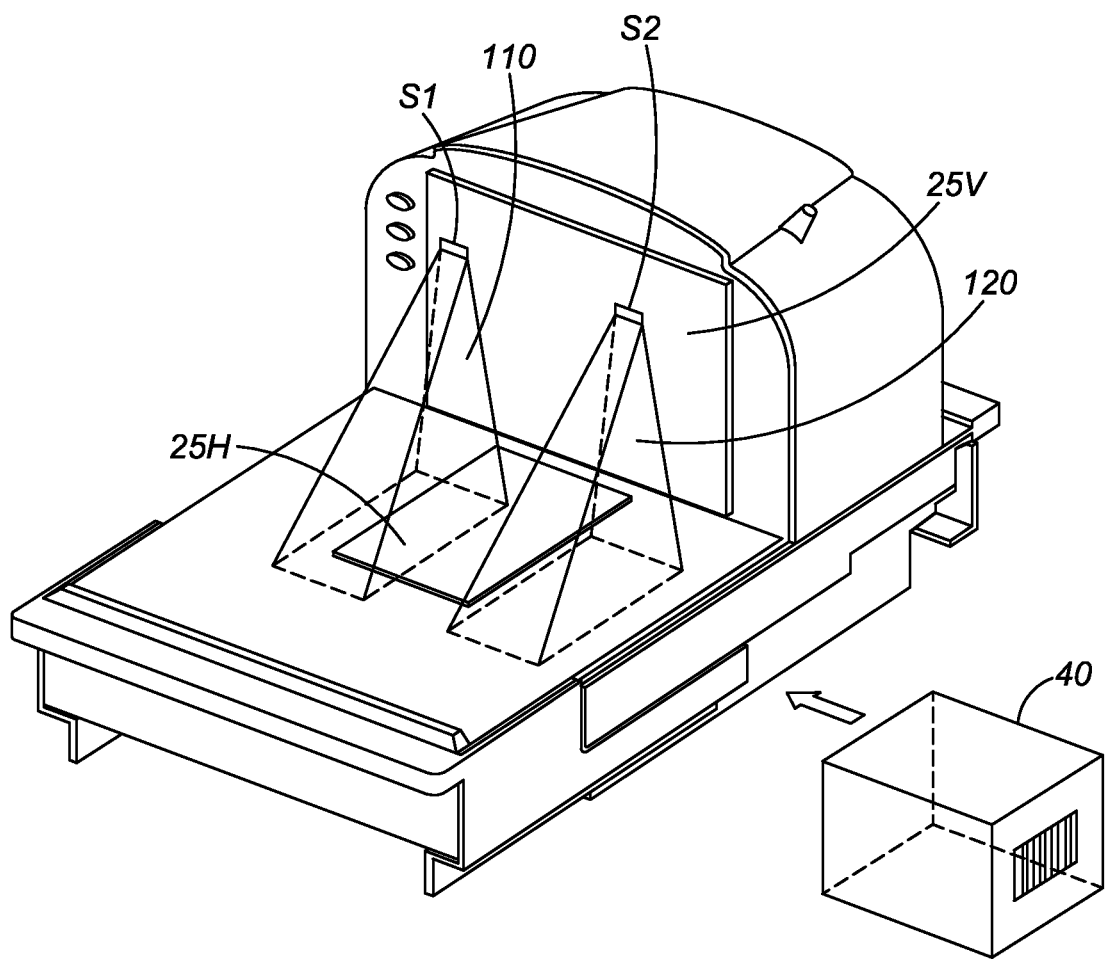
FIG. 4 depicts a workstation that includes two object sensors S1 and S2 in accordance with some embodiments.

FIG. 4 depicts a workstation that includes two object sensors S1 and S2 in accordance with some embodiments. Each object sensor is associated with a corresponding object field of view. Each object sensor is operative to detect the presence of an object within the corresponding object field of view of the object sensor. As shown in FIG. 4, the object sensor S1 is associated with an object field of view 110, and the object sensor S2 is associated with an object field of view 120. In some implementations, the object field of view 110 and the object field of view 120 essentially do not overlap with each other; but in other implementations, the object field of view 110 and the object field of view 120 may somewhat overlap with each other.

Figure 5:
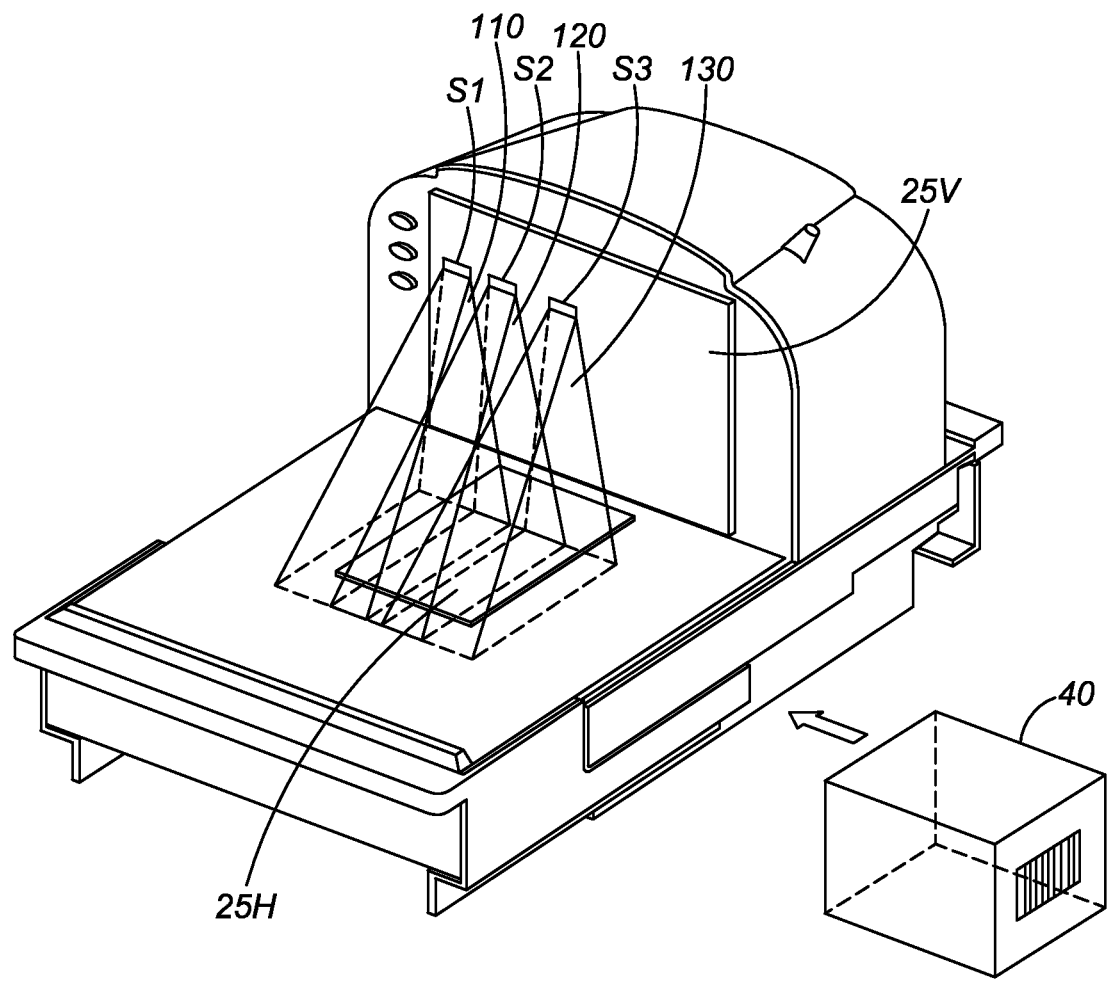
FIG. 5 depicts a workstation that includes three object sensors S1, S2, and S3 in accordance with some embodiments.

FIG. 5 depicts a workstation that includes three object sensors S1, S2, and S3 in accordance with some embodiments. Each object sensor is associated with a corresponding object field of view. Each object sensor is operative to detect the presence of an object within the corresponding object field of view of the object sensor. As shown in FIG. 5, the object sensors S1, S2, and S3 are respectively associated with object field of views 110, 120, and 130. In some implementations, none of object field of views 110, 120, and 130 overlap with others; but in other implementations, one or more of object field of views 110, 120, and 130 may somewhat overlap with another.

As shown in FIGS. 4 and 5, with multiple object sensors S1 and S2 implemented on a workstation, the moving direction of the object 40 can be determined. For example, as shown in FIG. 4, if the object sensor S2 detects the presence of an object before the object sensor S1 detects the presence of the object, then, it can be determined that this object is moving from right to left. On the other hand, if the object sensor S2 detects the presence of an object after the object sensor S1 detects the presence of the object, then, it can be determined that this object is moving from left to right.

With multiple object sensors implemented, the scanning throughput can be improved for a handfree scanning system. In a conventional handfree scanning system with only one object sensor implemented, the decoding is triggered by an object item entering the object field of view of the object sensor, subsequent decodes are not allowed until the first items has fully exited the scanning volume or the object field of view. When multiple object sensors with separate and diverse object field of views are implemented on the handfree scanning system, a second item can be decoded while the first item is still in the field of view. For example, such system will allow you to scan two cans of soda when swiped in the same direction where each is separately detectable while both are in the scanning volume. The software can determine when an item is entering or leaving each object field of view. Knowing the spatial relationship between the object detection system, such as left and right edge, the software can intelligently filter out double decodes while allowing a subsequent trigger and decode of a second item which follows the path of the first. For example, entering the volume from the left, and exiting on the right with one object will create an object detect event for the left and will ignore the one from the right. However, this will allow the operator to present a second item from the left while the first item is in view of the right. This filters out unnecessary secondary triggers. This can be applied to any direction including a right to left, right to center, limited only by the number of sensors and their spatial relationship.

Figure 6:
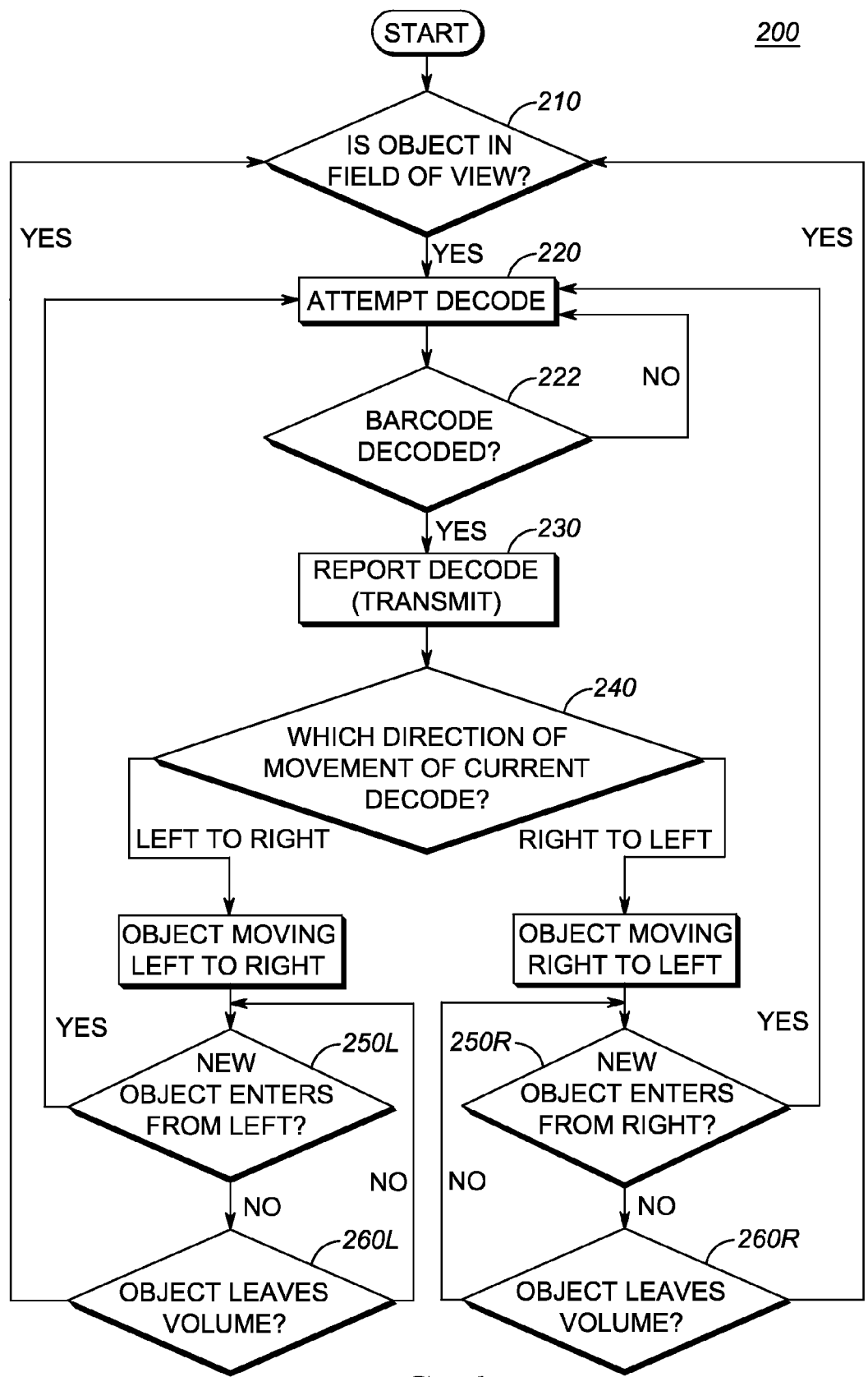
FIG. 6 is flow chart showing a method that uses multiple object sensors to increase the scanning throughput of a hand-free scanning system in accordance with some embodiments.

FIG. 6 is flow chart showing a method 200 that uses multiple object sensors to increase the scanning throughput of a handfree scanning system in accordance with some embodiments. Before any object entering the field of view of the barcode scanner, the scanner usually is at a standby state 210 trying to determine if any object is entering the field of view. If an object is detected within the field of view, at block 220, the scanner will attempt to decode the barcode on the object. Upon a successful decoding, at block 230, the successful decoding can be reported to the user or transmitted to other computers or servers. Subsequently, at block 240, the scanner will use the multiple object sensors to determine the direction of movement of the current object that has just been decoded.

As shown in FIG. 6, if the current object is found to be moving from left to right, at block 250L, the scanner will attempt to find if any new object is entering the field of view from the left. Upon the detection of a new object that is entering the field of view from the left, the computer program will follow the flow chart to move the operation to back block 220, and the scanner will attempt to decode the barcode on the this new object. But if no new object is found to be entering the field of view from the left and if the current object is found to be moved out of the field of view at block 260L, the computer program will follow the flow chart to move the operation back to block 210, and the scanner is back to the standby state 210 trying to determine if any object is entering the field of view.

Similarly, as shown in FIG. 6, if the current object is found to be moving from right to left, at block 250R, the scanner will attempt to find if any new object is entering the field of view from the right. Upon the detection of a new object that is entering the field of view from the right, the computer program will follow the flow chart to move the operation to back block 220, and the scanner will attempt to decode the barcode on the this new object. But if no new object is found to be entering the field of view from the right and if the current object is found to be moved out of the field of view, the computer program will follow the flow chart to move the operation back to block 210, and the scanner is back to the standby state 210 trying to determine if any object is entering the field of view at block 260R.

Figure 7A:
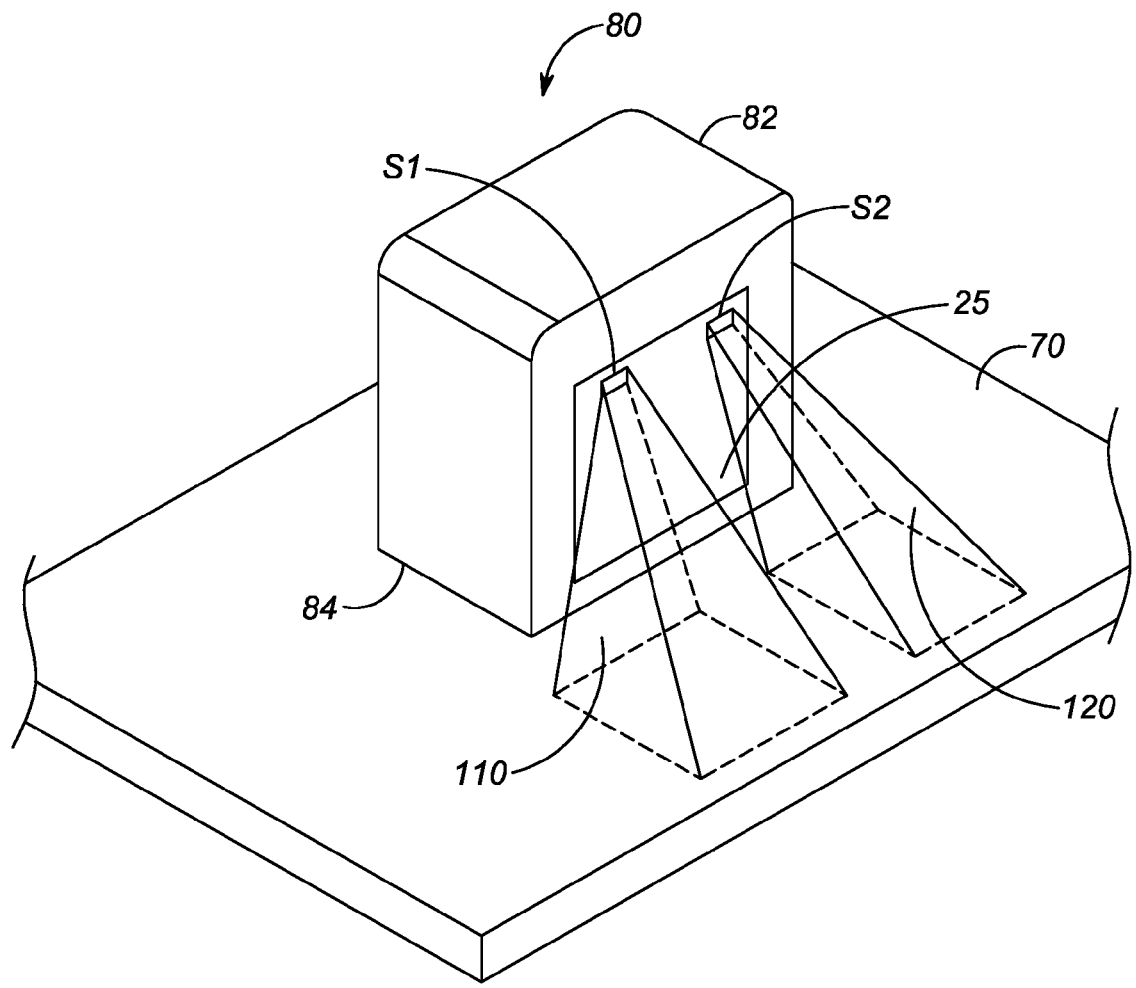
FIGS. 7A-7B and FIGS. 8A-8B depict some example portable scanners that have multiple object sensors for increasing the scanning throughput in accordance with some embodiments.

The above described method that uses multiple object sensors to increase the scanning throughput can also be implemented in other kinds of portable scanners. FIGS. 7A-7B and FIGS. 8A-8B depict some example portable scanners that have multiple object sensors for increasing the scanning throughput in accordance with some embodiments. The portable scanner 80 in FIGS. 7A-7B or in FIGS. 8A-8B has a window 25, a housing 82, and a base 84 for supporting itself on a flat surface 70, such as, a countertop. The window 25 generally faces an operator at the workstation. The portable scanner 80 in FIGS. 7A-7B or in FIGS. 8A-8B also includes two object sensors S1 and S2. Each object sensor is associated with a corresponding object field of view and or is operative to detect the presence of an object within the corresponding object field of view. As shown in FIG. 7A or FIG. 8A, the object sensor S1 is associated with an object field of view 110, and the object sensor S2 is associated with an object field of view 120. With the object sensors S1 and S2, it is possible for the portable scanner 80 to determine the moving direction of an object entering its field of view.

Figure 7B:
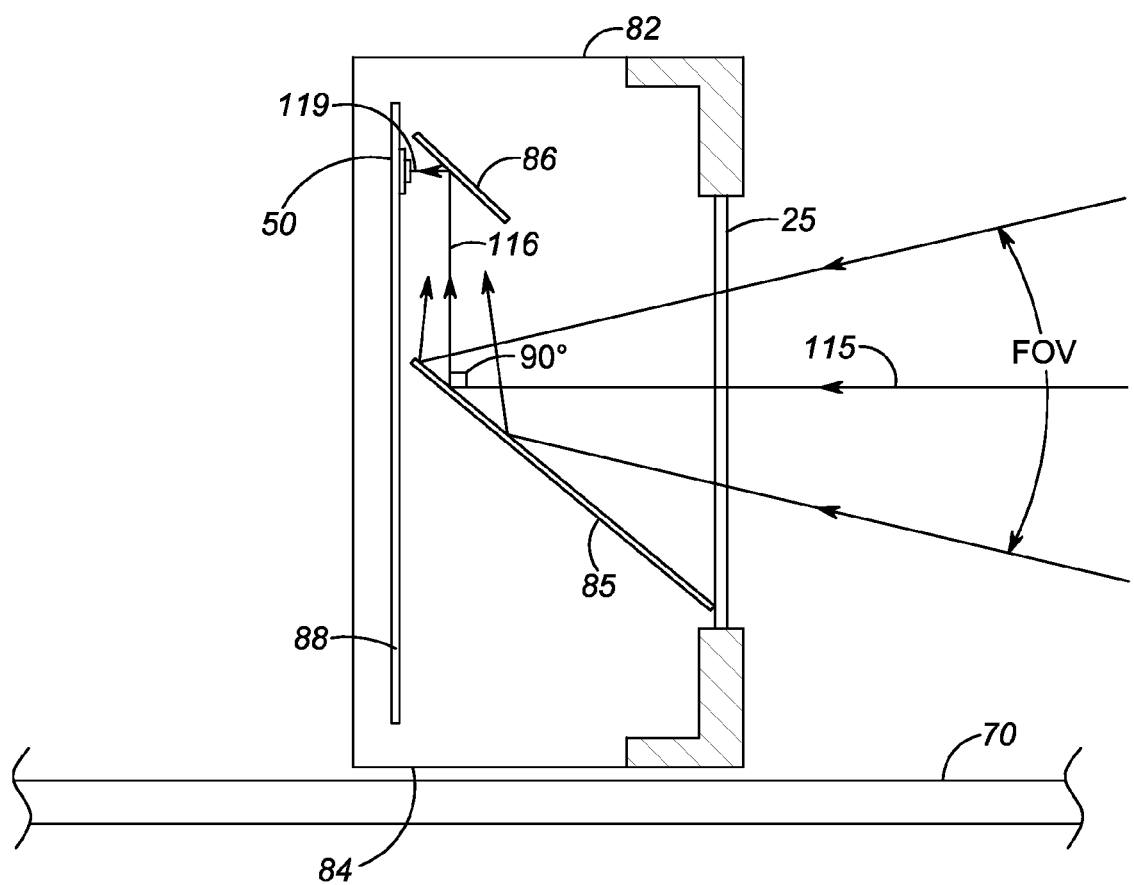
Figure 8A:
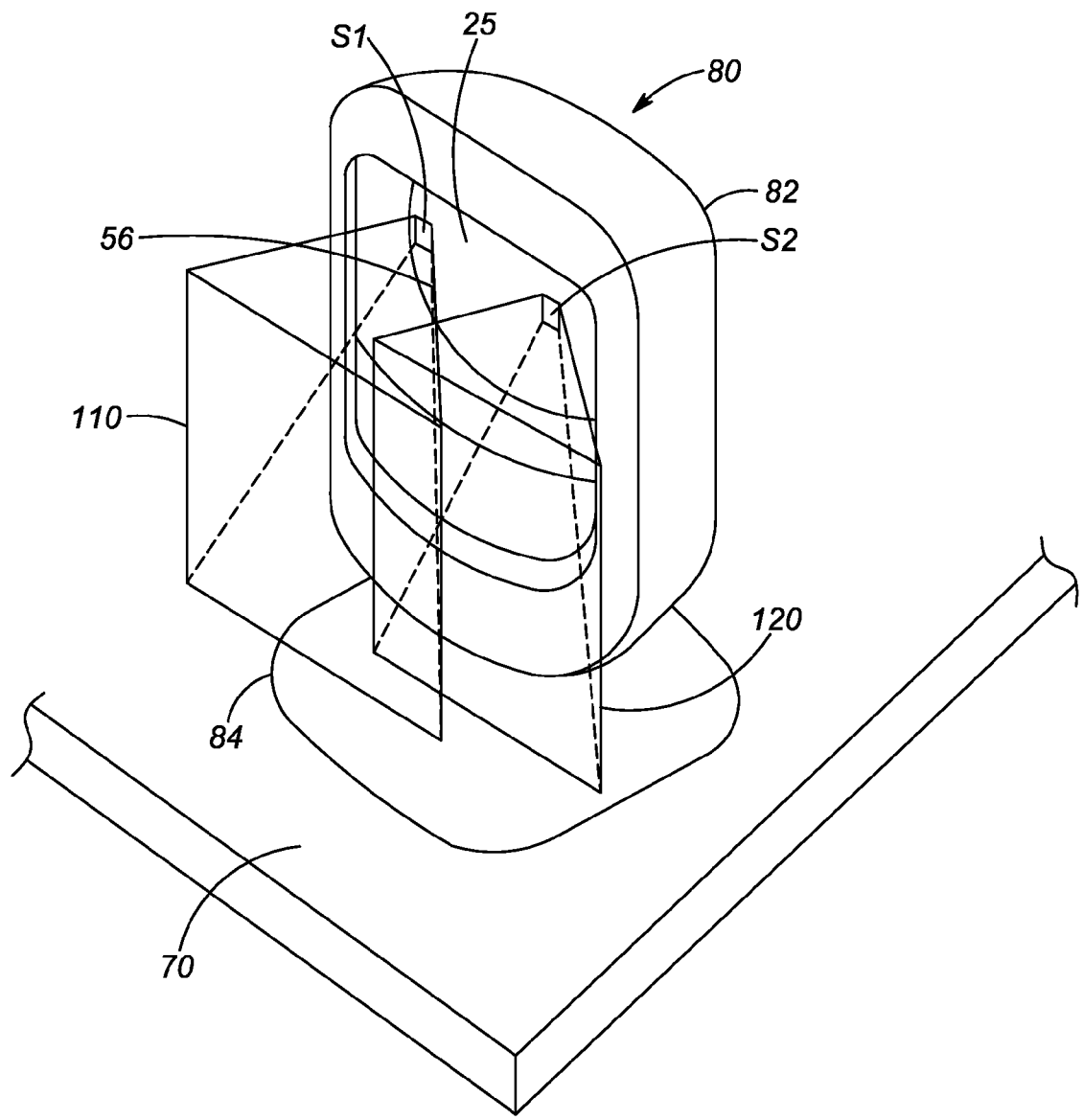
Figure 8B:
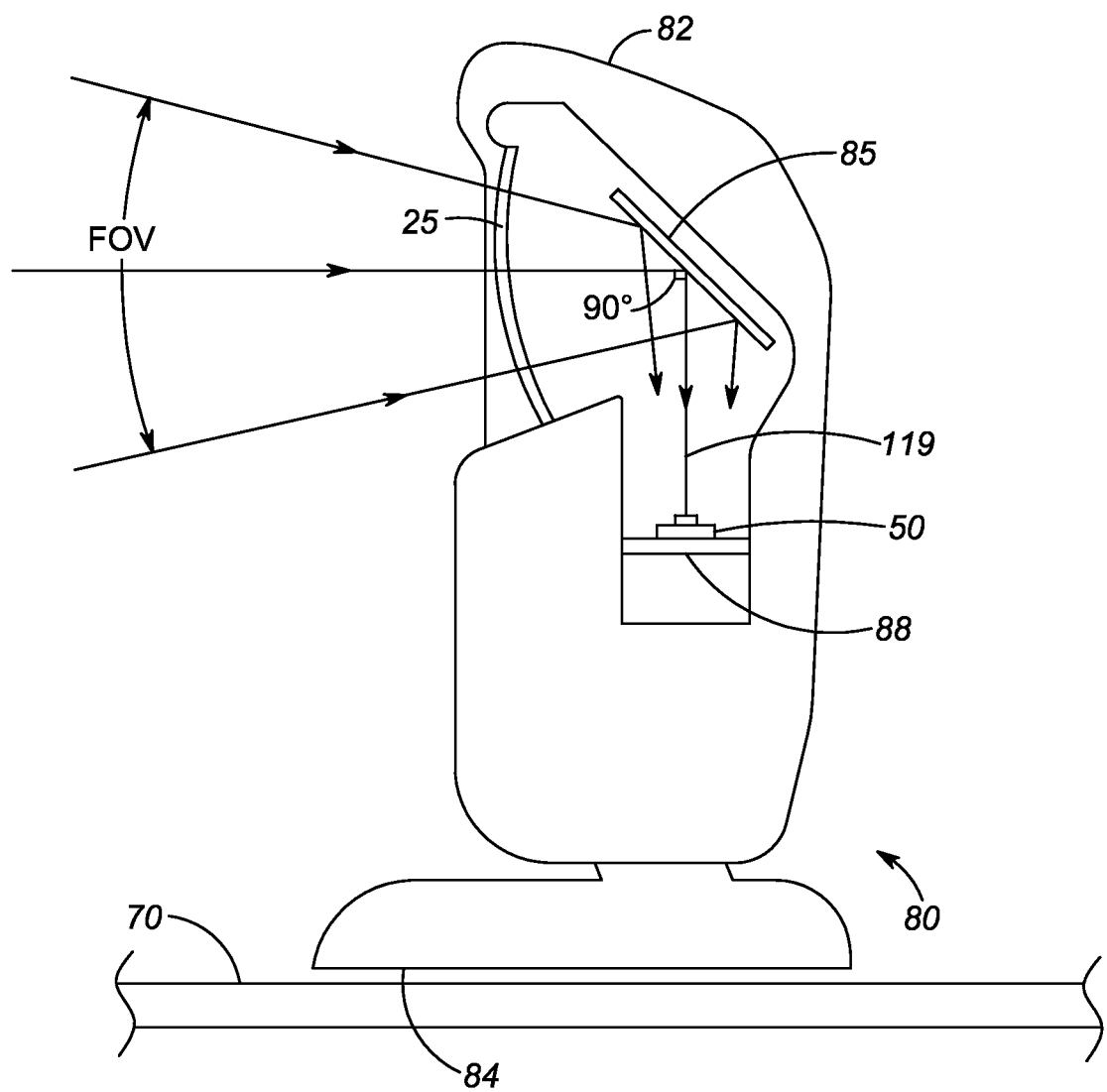

The portable scanner 80 in FIGS. 7A-7B or in FIGS. 8A-8B also includes a solid-state imager 50 on a printed circuit board 88 and a principal mirror 85 generally facing the window 25. Light from an object within the field of view (FOV) of the portable scanner 80, after reflected by the principal mirror 85, eventually enters the solid-state imager 50. The principal mirror 85 is orientated and configured in such a way to reflect the principal light ray by an angle of about 90 degrees, where the principal light ray is defined as the light ray passing through the window 25 that eventually enters the solid-state imager 50 in a direction substantially parallel to the optical axis of the solid-state imager 50. In some implementations, the above mentioned angle of about 90 degrees is between 85 degrees to 95 degrees. In some other implementations, the above mentioned angle of about 90 degrees is between 80 degrees to 100 degrees. In FIG. 7B, the principal light ray 115, after passing through the window 25, is reflected 90 degrees by the principal mirror 85 as light ray 116. The light ray 116 is reflected by a secondary mirror 86 and enters the solid-state imager 50 in a direction substantially parallel to the optical axis of the solid-state imager 50 as light ray 119. In FIG. 8B, the principal light ray 115, after passing through the window 25, is reflected 90 degrees by the principal mirror 85 as light ray 119 that enters the solid-state imager 50 in a direction substantially parallel to the optical axis of the solid-state imager 50.

In some applications, a portable scanner 80 with a design similar to that in FIG. 7B or in FIG. 8B can be placed above a moving belt for decoding the barcodes on the objects placed on the moving belt. With two or more object sensors implemented on the portable scanner 80, the scanning throughput for the objects on the moving belt can be improved.

In the foregoing specification, specific embodiments have been described. However, one of ordinary skill in the art appreciates that various modifications and changes can be made without departing from the scope of the invention as set forth in the claims below. For example, while the object sensor can be implemented with an infrared light emitting diode and a photodetector, a solid-state imager can be used as the object sensor as well. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter

What is claimed is:

1. A method of decoding using an imaging scanner having a solid-state imager and having multiple object sensors each associated with an object field of view, the method comprising:
   detecting whether an object is presence within any one of the object field of views;
   upon detecting the presence of the object within any one of the object field of views, activating one or more illumination light sources toward the object;
   detecting light reflected from the object with the solid-state imager to capture an image of the object in memory;
   processing the image captured by the solid-state imager to decode a barcode in the image captured;
   determining a moving direction of the object using at least two of the multiple object sensors, wherein the moving direction of the object points from a first side to a second side of the imaging scanner;
   upon successful decoding of the barcode in the image captured, detecting whether a new object is presence with the object sensor located on the first side of the imaging scanner;
   upon detecting the presence of the new object within the object field of view of the object sensor located on the first side of the imaging scanner, activating one or more illumination light sources toward the new object;
   detecting light reflected from the new object with the solid-state imager to capture an image of the new object in memory; and
   processing the image of the new object to decode an barcode on the new object.

2. The method of claim 1, wherein said detecting light reflected from the new object comprises:
   detecting light reflected from the new object with the solid-state imager to capture an image of the new object in memory while an old object is still within one of the object field of views.

3. The method of claim 1, wherein each object sensor includes an infrared light emitting diode and a photodetector.

4. The method of claim 1, wherein at least one of the multiple object sensors includes an infrared light emitting diode and a photodetector.

5. The method of claim 1, wherein at least one of the multiple object sensors includes another solid-state imager.

6. A method of decoding using an imaging scanner having a solid-state imager and having multiple object sensors each associated with an object field of view, the method comprising:
   detecting whether an object is presence within any one of the object field of views;
   upon detecting the presence of the object within any one of the object field of views, activating one or more illumination light sources toward the object, and capturing an image of the object in memory by detecting light reflected from the object with the solid-state imager;
   determining a moving direction of the object using at least two of the multiple object sensors, wherein the moving direction of the object points from a first side to a second side of the imaging scanner;
   detecting whether a new object is presence with the object sensor located on the first side of the imaging scanner;
   upon detecting the presence of the new object within the object field of view of the object sensor located on the first side of the imaging scanner, activating one or more illumination light sources toward the new object, and capturing an image of the new object in memory by detecting light reflected from the new object with the solid-state imager.

7. The method of claim 6, wherein said capturing an image of the new object in memory comprises:
   capturing an image of the new object in memory by detecting light reflected from the new object with the at least one of the solid-state imager while an old object is still within one of the object field of views.

8. The method of claim 6, wherein said determining a moving direction of the object comprises:
   determining a moving direction of the object using at least two of the multiple object sensors before said capturing an image of the object in memory.

9. The method of claim 6, wherein said determining a moving direction of the object comprises:
   determining a moving direction of the object using at least two of the multiple object sensors after said capturing an image of the object in memory.

10. The method of claim 6, wherein said determining a moving direction of the object comprises:
    determining a moving direction of the object using at least two of the multiple object sensors while capturing an image of the object in memory.

11. The method of claim 6, further comprising:
    processing the image captured by the solid-state imager to decode a barcode in the image captured after said capturing an image of the object in memory.

12. The method of claim 6, further comprising:
    processing the image of the new object to decode any barcode on the new object after said capturing an image of the new object in memory.

13. The method of claim 6, wherein each object sensor includes an infrared light emitting diode and a photodetector.

14. The method of claim 6, wherein at least one of the multiple object sensors includes an infrared light emitting diode and a photodetector.

15. The method of claim 6, wherein at least one of the multiple object sensors includes another solid-state imager.

16. An imaging scanner comprising:
    a portable housing configured for standing on top of a flat surface with a vertical axis of the portable housing perpendicular to the flat surface;
    a window on the portable housing;
    a primary mirror generally facing the window and titled with respect to the vertical axis of the portable housing by an angle between 40 to 50 degrees;
    a solid-state imager having an array of photosensitive elements on a substrate that is either perpendicular to the vertical axis of the portable housing or parallel to the vertical axis of the portable housing, wherein the solid-state imager is operative to capture light from a target object within a field of view after said light from the target object passes through the window and gets reflected by the primary mirror;
    multiple object sensors each associated with an object field of view, wherein each object sensor includes an infrared light emitting diode and a photodetector; and
    a controller operative to determine a moving direction of an object using at least two of the multiple object sensors, wherein the moving direction of the object points from a first side to a second side of the imaging scanner.

17. The imaging scanner of claim 16, wherein the primary mirror is titled with respect to the vertical axis of the portable housing by an angle of substantially 45 degrees.

18. The imaging scanner of claim 16, wherein the controller is operative to enable an image of a new object be captured in memory with the solid-state imager while an old object is still within one of the object field of views associate with the multiple object sensors.

19. The imaging scanner of claim 16, further comprising;
    a circuit board located inside the portable housing configured to hold the solid-state imager thereon, the circuit board being substantially parallel to the vertical axis of the portable housing.

20. The imaging scanner of claim 16, further comprising;
    a circuit board located inside the portable housing configured to hold the solid-state imager thereon, the circuit board being substantially perpendicular to the vertical axis of the portable housing.

* * * * *